United States Patent [19]

Van Laar

[11] Patent Number: 4,718,492

[45] Date of Patent: Jan. 12, 1988

[54] PROCESS FOR PASSING CARBON DIOXIDE THROUGH A CASED, CEMENTED AND PERFORATED WELL

[75] Inventor: Hermanus G. Van Laar, Calgary, Canada

[73] Assignee: Shell Oil Company, Houston, Tex.

[21] Appl. No.: 65,171

[22] Filed: Jun. 16, 1987

Related U.S. Application Data

[63] Continuation of Ser. No. 827,922, Feb. 10, 1986, abandoned.

[30] Foreign Application Priority Data

Feb. 11, 1985 [CA] Canada ................................. 473990

[51] Int. Cl.⁴ ...................... E21B 33/138; E21B 41/02
[52] U.S. Cl. .................................. 166/295; 166/268; 166/902
[58] Field of Search ............... 166/268, 281, 295, 297, 166/298, 300, 387, 902

[56] References Cited

U.S. PATENT DOCUMENTS

| | | | |
|---|---|---|---|
| 3,123,138 | 3/1964 | Robichaux | 166/295 |
| 3,172,471 | 3/1965 | Warren | 166/281 |
| 3,339,633 | 9/1967 | Richardson | 166/295 |
| 3,437,143 | 4/1969 | Cook | 166/297 X |
| 3,455,388 | 7/1969 | Huitt | 166/281 X |
| 3,552,493 | 1/1971 | Bezemer | 166/295 |
| 3,709,298 | 1/1973 | Pramann | 166/295 X |
| 3,743,020 | 7/1973 | Suman, Jr. et al. | 166/281 X |
| 3,747,678 | 7/1973 | Waid | 166/295 |
| 3,820,604 | 6/1974 | Karnes | 166/297 |
| 4,189,002 | 2/1980 | Martin | 166/295 |

OTHER PUBLICATIONS

SPE 12593: *Effects of Supercritical Carbon Dioxide on Well Cements,* D. D. Onan, 1984.

"Dowell Schlumberger Says New Cement Resists $CO_2$ Corrosion," *Enhanced Recovery Week,* Jun. 23, 1986, pp. 4,5.

*Primary Examiner*—George A. Suchfield

[57] ABSTRACT

In a process for completing and operating a well, which process involves passing carbon dioxide through a case, cemented and perforated well, carbon dioxide-induced damage of the cement is avoided by coating the cement tunnel walls so that the carbon dioxide is passed through perforation tunnels which have been internally coated by epoxy resin.

8 Claims, No Drawings

PROCESS FOR PASSING CARBON DIOXIDE THROUGH A CASED, CEMENTED AND PERFORATED WELL

This is a continuation of application Ser. No. 827,922, filed Feb. 10, 1986, now abandoned.

BACKGROUND OF THE INVENTION

The invention relates to a process for passing carbon dioxide through a cased, cemented and perforated well. Carbon dioxide in the presence of moisture leads to carbonic acid attack of oil well cement. This attack, if allowed to proceed unchecked eventually weakens the cement to an unacceptable condition. The major constituent of set cement, hydrated calcium silicate breaks down by the action of $CO_2$ as follows:

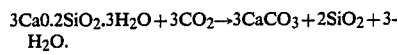
$$3CaO.2SiO_2.3H_2O + 3CO_2 \rightarrow 3CaCO_3 + 2SiO_2 + 3H_2O.$$

The reaction products calcium carbonate and silica possess less binding power than hydrated calcium silicate. Therefore, a considerable deterioration in cement strength takes place by $CO_2$ attack.

Cement is exposed to $CO_2$ in wells for injection of $CO_2$ and in those used for the production of reservoir fluid which, at a certain stage of a $CO_2$-flooded project, contains $CO_2$ as well. Also in source wells, used for the supply of $CO_2$, there is exposed cement.

The only place of exposure of cement to $CO_2$ in injection, production and source wells is at the perforations, where the perforation tunnels traverse the cement sheath between casing and borehole. To maintain the integrity of injection, production and source wells, the exposed cement should be shielded from $CO_2$ attack. This can be achieved by providing the exposed cement with an impermeable layer of inert material which protects the cement. This protective layer applied on the cylindrical walls of the perforation tunnels, should be strong enough to resist high shear rates normally occurring in well perforations, but yet thin enough to prevent injectivity or productivity impairment. It has now been found that epoxy resin is very suitable for this purpose. The invention therefore relates to a process for passing carbon dioxide through a case, cemented and perforated well, characterized in that the carbon dioxide is passed through perforation tunnels in the cement which have been internally coated by epoxy resin.

SUMMARY OF THE INVENTION

The invention relates to improving a process for completing and operating a well in which a casing string is cemented and perforated and $CO_2$-containing fluid is flowed through the casing perforations and cement tunnels and into or out of a subterranean reservoir. The improvement reduces $CO_2$-induced corrosion or damaging of the cement by a combination of steps. An aqueous liquid which is compatible with the liquid in the well and reservoir is flowed into and out of contact with the casing perforations and cement tunnels to displace debris from the perforations and tunnels. A volume of oleogenous liquid which is not significantly more than enough to fill the casing perforations and cement tunnels is displaced ahead of the same or similar aqueous liquid so that the perforations and tunnels become filled with an oleogenous liquid which contains dissolved epoxy resin-forming components and epoxy resin curing agent capable of subsequently forming cured epoxy resin on solid surfaces at the reservoir temperature. The oleogenous liquid is kept at least substantially static until a deposition of at least substantially cured epoxy resin has occurred. An aqueous liquid which is compatible with the liquid in the well and reservoir is flowed into and out of contact with the casing perforations and cement tunnels to displace undeposited resin-forming components. $CO_2$-containing fluid is then flowed through the resin-coated casing perforations and cement tunnels.

DESCRIPTION OF THE INVENTION

The protective layer of epoxy resin may be installed by adapting conventional methods used by drilling contractors.

The protective layer of epoxy resin is suitably installed as described hereinafter. After cementing the casing string in a $CO_2$ production or injection well, the casing is perforated, suitably in brine, and the perforations are advantageously washed clean.

If the perforated interval is less than 3 m long, a retrievable packer with a tail pipe is preferably run on tubing and suspended, preferably 0.5–1.5 m, above the highest perforation; in case the interval is longer than 3 m, a retrievable straddle packer is preferably placed across the lowest 3 m of the interval. As an alternative a through-tubing expandable/collapsable straddle packer can be run on coiled tubing as a selective placement tool.

The bottom end of the tail pipe should reach to below the lowest perforations with the packer in the set position.

Before setting the packer, a predetermined volume of coating fluid—a solution of freshly mixed epoxy resin, preferably having an epoxy resin concentration in the range of from 10–20% w—is chased down the tubing with brine. The volume of coating fluid suitably equals the sum of the volumes of:

the casing hole below the packer
the total contents of all perforation tunnels to be treated in a 3 m interval
a small excess corresponding with a minimal penetration into the formation, only in case the formation permeability exceeds 500 mD.

Separating plugs are advantageously used between the brine and the coating fluid; a plug-catching device is suitably used at the bottom end of the tail pipe.

After setting the packer a volume of brine, advantageously equal to the volume of the perforation tunnels and a small penetration of fluid into the formation, is pumped down the tubing at a rate suitably not exceeding 0.1 $m^3$/min per m interval treated.

After a suitable curing time, preferably 2 to 6 hours, the packer is released and brine circulated, suitably, for at least two hours advantageously at a rate not exceeding 1 $m^{-3}$/min. Then the packer is pulled and the well is further completed.

In case the interval is longer than 3 m, the straddle packer is preferably re-positioned to a maximum of 3 m above the previous treatment position and the operation, described hereinbefore, is repeated.

The re-positioning of the straddle packer and the following operation are repeated as many times as required to treat the whole interval.

As mentioned hereinbefore the perforation tunnels in the cement are internally coated with an epoxy resin.

Epoxy resins are usually based on the glycidyl ether of bisphenol-A. The resins are manufactured as a series of polymers, the lowest molecular weight polymer is liquid at room temperature. Each polymer contains two epoxy-functional groups and cross-linking is achieved by reaction between the epoxy groups and a curing agent. Curing agents may be Lewis acids or Lewis bases. Advantageously polyamines are used. Resin and curing agent are storable under a wide range of conditions without deterioration; the two components are mixed at the well site immediately prior to use. The rate of polymerization is usually controlled by a third component, an accelerator (preferably phenol). Most commercial epoxy resin consolidation systems contain a coupling agent, usually an epoxy-functional or amine-functional silane.

Epoxy resins are proving to be a better option than phenolic or furan resins for the following reasons: (1) The two-component epoxy system, consisting of resin and curing agent, has greater flexibility of usage and better storage properties than the one-component phenolic or furan systems. (2) Epoxy resins cure without the formation of a bi-product. The formation of water during the cure of phenolic and furan resins has been shown to have a detrimental effect on the integrity of the bond between resin and cement. (3) Tests have shown that epoxy-resin systems provide a more durable coating than phenolic or furan resin systems. (4) Epoxy resin coating technology is far advanced and the development of epoxy resin coating systems continues to take advantage of "spin-off" technology.

The invention will now be further elucidated by the following Example to which it is by no means restricted.

EXAMPLE

The following would comprise an exemplary well treatment.

A $CO_2$ injection well is completed with $9\frac{5}{8}$-inch casing (59.51 kg/m) in $12\frac{1}{4}$-inch hole through sandstone with an average permeability and porosity of 1200 mD and 15% respectively, at 2250 m. The casing is perforated in brine (density 1100 kg/m$^3$) from 2246 to 2249 m with $\frac{1}{2}$-inch holes, 13 per m, total 39 holes. The perforations are internally coated as follows:

A retrievable $9\frac{5}{8}$-inch packer with a 4.5 m $2\frac{3}{8}$-inch tail pipe (7.0 kg/m) is run on $2\frac{3}{8}$-inch tubing (7.0 kg/m) to 2245 m. 0.282 m$^3$ of coating fluid, preceded and followed by separator plugs, is pumped down at a rate of 0.5 m$^3$/min, followed by 4.430 m$^3$ of brine. The packer is set at 2245 m and 0.096 m$^3$ of brine pumped at a rate of 0.09 m$^3$/min.

After four hours curing time, the packer is released and brine circulated at a rate of 0.8 m$^3$/min for two hours. The packers is pulled to surface and the well further completed. In this treatment the perforations internally coated with a 476 μm layer of epoxy resin, which effectively protects the cement against chemical attack by $CO_2$.

The injected surplus epoxy has internally coated the formation pores to an average radial depth of 15 cm. The resulting reduction in permeability of the affected zone is about 15 percent; the effect on overall productivity is a reduction of only 2 percent.

The coating fluid used consists of:
11.2% vol Epikote 828*
3.7 % vol diaminodiphenylmethane
0.3 % vol metacresol
0.3 % vol silane**
175 g/l phenol
2.0 % vol isopropyl alcohol
6.6 % vol acetone
52.4 % vol xylene
23.6 % vol kerosene

*Proprietary name for uncured epoxy resin, traded by Shell.
**Dow Corning compound Z-6040.

What is claimed is:

1. In a process for completing and operating a well for production of a liquid from a subterranean reservoir in which a casing string is cemented and perforated and a $CO_2$-containing fluid is flowed through a plurality of casing perforations and cement tunnels into or out of the reservoir, an improved process for reducing $CO_2$-induced damage of the cement, comprising:

injecting a first aqueous liquid which is compatible with the liquid in the well and the reservoir into the casing string prior to the flowing of the $CO_2$-containing fluid;

flowing the first aqueous liquid into and out of contact with the casing perforations and the cement tunnels to displace debris from the casing perforations and the cement tunnels;

injecting into the casing string a volume of an oleogenous liquid which contains a plurality of dissolved epoxy resin-forming components and epoxy resin-curing agents capable of subsequently forming and depositing a cured epoxy resin at the reservoir temperature and has a volume which is not significantly more than enough to fill the casing perforations and the cement tunnels;

injecting a second aqueous liquid which is compatible with the liquid in the well and reservoir into the casing string;

displacing the oleogenous liquid ahead of the second aqueous liquid so that the oleogenous liquid is driven to fill the casing perforations and the cement tunnels;

maintaining the oleogenous liquid at least substantially stationary until a deposition of at least substantially cured epoxy resin has occurred substantially selectively within the casing perforations and the cement tunnels;

injecting into the casing string a third aqueous liquid which is compatible with the liquid in the well and reservoir;

flowing the third aqueous liquid into and out of contact with the casing perforations and the cement tunnels to displace the resin-forming components which are undeposited; and subsequently flowing the $CO_2$-containing fluid through the resin coated casing perforations and the cement tunnels.

2. Process as claimed in claim 1 in which the epoxy resin is based on the glycidylether of bisphenol-A.

3. Process as claimed in claim 1 in which the perforation tunnels in the cement are coated by means of an oleogenous liquid coating fluid containing an epoxy resin, a polyamine and phenol in an organic solvent.

4. Process as claiemd in claim in which a retrievable packer with tail pipe is run on tubing and suspended above the highest perforation, the packer is set and brine is pumped down the tubing as the second aqueous liquid to chase the volume of the oleogenous liquid to fill the casing perforations and the cement tunnels, after the oleogenous liquid is maintained at least substantially stationary for 2 to 6 hours, the packer is released and brine is circulated as the third aqueous liquid to displace the resin-forming components which are undeposited, then the packer is pulled to the surface and the well further completed.

5. Process as claimed in claim 4, in which the retrievable packer is suspended 0.5–1.5 m above the highest perforation.

6. Process as claimed in claim 4 in which brine is circulated at a rate not exceeding 1 m$^3$/min for at least two hours.

7. A process as claimed in claim 1 wherein the first, second and third aqueous liquids which are compatible with the liquid in the well and the reservoir are the same.

8. A method for protecting a well completion having a cemented and perforated casing string from $CO_2$ degradation in which casing perforations and cement tunnels are coated after well completion by the method comprising:
- displacing debris from the casing perforations and the cement tunnels by flowing a well compatible aqueous liquid into and out of contact with the casing perforations and cement tunnels;
- suspending a retrievable packer with a tail pipe run on a tubing above the highest perforation in the casing;
- filling the casing perforations and the cement tunnels with an oleogenous liquid solution which includes an epoxy resin based on a glycidylether of bisphenol-A, a polyamine and phenol in an organic solvent and which is capable of subsequently forming and depositing a cured epoxy resin at the reservoir temperature, by chasing a volume of the oleogenous liquid solution, which is not significantly more than enough to fill the casing perforations and cement tunnels, with brine;
- maintaining the oleogenous liquid solution at least substantially stationary until a deposition of at least substantially cured epoxy resin has occurred substantially selectively within the casing perforations and the cement tunnels;
- releasing the packer and circulating brine into and out of contact with the casing perforations and the cement tunnels to displace undeposited epoxy resin; and
- removing the packer.

* * * * *